United States Patent
Tetsumoto et al.

(10) Patent No.: US 7,032,526 B2
(45) Date of Patent: Apr. 25, 2006

(54) METHOD FOR COMBUSTION TREATMENT OF COMBUSTIBLE WASTE AND APPARATUS THEREFOR

(75) Inventors: Masahiko Tetsumoto, Kobe (JP); Hiroshi Sugitatsu, Kobe (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 10/223,367

(22) Filed: Aug. 20, 2002

(65) Prior Publication Data
US 2003/0037714 A1 Feb. 27, 2003

(30) Foreign Application Priority Data
Aug. 22, 2001 (JP) .............................. 2001-251831

(51) Int. Cl.
*F23B 7/00* (2006.01)
*F23G 5/00* (2006.01)

(52) U.S. Cl. ................ 110/342; 110/346; 110/275; 110/287; 110/302; 110/303; 110/247

(58) Field of Classification Search ................ 110/226, 110/227, 228, 275, 287, 288, 301, 302, 303, 110/342, 343, 344, 345, 182.5, 346, 246, 110/247; 432/138
See application file for complete search history.

(56) References Cited

U.S. PATENT DOCUMENTS

| | | | | |
|---|---|---|---|---|
| 1,913,088 A | * | 6/1933 | Ridgely | ....................... 110/275 |
| 3,443,931 A | | 5/1969 | Beggs et al. | |
| 3,575,119 A | * | 4/1971 | Marr | .............................. 110/8 |
| 3,605,656 A | | 9/1971 | Stribling | |
| 3,671,167 A | * | 6/1972 | Nakano | ....................... 431/190 |
| 3,680,503 A | * | 8/1972 | Danielsson et al. | ......... 110/247 |
| 3,716,002 A | * | 2/1973 | Porter et al. | ................... 110/14 |
| 3,716,339 A | * | 2/1973 | Shigaki et al. | ................. 23/262 |
| 4,063,903 A | * | 12/1977 | Beningson et al. | .............. 44/2 |
| 4,437,418 A | * | 3/1984 | Guillaume et al. | .......... 110/246 |
| 4,452,153 A | * | 6/1984 | Deneau | ....................... 110/247 |
| 4,602,573 A | * | 7/1986 | Tanca | .......................... 110/342 |
| 4,846,082 A | * | 7/1989 | Marangoni | .................. 110/234 |

(Continued)

FOREIGN PATENT DOCUMENTS

DE 645 759 6/1937

(Continued)

OTHER PUBLICATIONS

U.S. Appl. No. 10/223,367, filed Aug. 20, 2002, Tetsumoto et al.

(Continued)

*Primary Examiner*—Kenneth Rinehart
(74) *Attorney, Agent, or Firm*—Oblon, Spivak, McClelland, Maier & Neustadt, P.C.

(57) ABSTRACT

The present invention can provide a method for combustion treatment capable of efficiently treating combustible waste, and a combustion treatment apparatus capable of realizing such a method. The present invention can further provide a method for combustion treatment capable of efficiently treating even combustible waste containing a generation source of a volatile hazardous component, and a combustion treatment apparatus capable of realizing this. Furthermore, the present invention can provide a method for combustion treatment capable of efficiently recovering and making effective use of the heat of an exhaust gas discharged during a treatment of combustible waste, and a combustion treatment apparatus capable of realizing this. The aforementioned method for combustion treatment is a method for treating combustible waste, in which the combustible waste is subjected to combustion treatment in a rotary hearth furnace.

12 Claims, 11 Drawing Sheets

U.S. PATENT DOCUMENTS

| | | | |
|---|---|---|---|
| 4,890,563 A * | 1/1990 | White et al. | 110/246 |
| 5,005,493 A * | 4/1991 | Gitman | 110/246 |
| 5,102,330 A * | 4/1992 | Ho | 432/143 |
| 5,138,957 A * | 8/1992 | Morey et al. | 110/234 |
| 5,254,797 A * | 10/1993 | Imoto et al. | 588/207 |
| 5,885,521 A | 3/1999 | Meissner et al. | |
| 5,989,019 A | 11/1999 | Nishimura et al. | |
| 6,063,156 A | 5/2000 | Negami et al. | |
| 6,129,777 A | 10/2000 | Fuji et al. | |
| 6,149,709 A | 11/2000 | Uragami et al. | |
| 6,152,983 A | 11/2000 | Kamijo et al. | |
| 6,213,030 B1 * | 4/2001 | Robertson et al. | 110/246 |
| 6,241,803 B1 | 6/2001 | Fuji | |
| 6,251,161 B1 | 6/2001 | Tateishi et al. | |
| 6,254,665 B1 | 7/2001 | Matsushita et al. | |
| 6,258,149 B1 | 7/2001 | Sugiyama et al. | |
| 6,296,479 B1 | 10/2001 | Nishimura et al. | |
| 6,319,302 B1 | 11/2001 | Harada | |
| 6,334,883 B1 | 1/2002 | Takenaka et al. | |
| 6,368,104 B1 * | 4/2002 | Saxena et al. | 432/138 |
| 6,368,379 B1 | 4/2002 | Tateishi et al. | |

FOREIGN PATENT DOCUMENTS

| | | |
|---|---|---|
| FR | 2 135 885 | 12/1972 |
| FR | 2 614 394 | 10/1988 |
| JP | 2000-140800 | 5/2000 |

OTHER PUBLICATIONS

U.S. Appl. No. 10/677,263, filed Oct. 3, 2003, Sugitatsu et al.

* cited by examiner

METHOD FOR COMBUSTION TREATMENT OF COMBUSTIBLE WASTE AND APPARATUS THEREFOR

BACKGROUND OF THE INVENTION

1. Field of the Invention

The present invention relates to a method for efficiently combustion-treating combustible waste, and relates to an apparatus used for realizing such a method for combustion treatment.

2. Description of the Related Art

Much of urban refuse and industrial waste are subjected to incineration treatments with incineration equipment and, thereafter, are disposed of in landfills, or are disposed of in landfills with no incineration treatment. However, in recent years, available landfills have been reduced and, therefore, the treatment has approached a limit. Consequently, a technique for performing a gasification treatment and volume reduction of the combustible component by efficiently combustion-treating the combustible waste, for example, waste plastic, has been required.

Herein, in many cases, the combustible waste includes waste containing chlorine, such as a vinyl chloride-based resin, waste containing sulfur, such as vulcanized rubber, and furthermore, waste containing highly volatile metal elements, for example, alkali metals, lead, and zinc, and the like. However, when such waste containing chlorine and/or sulfur is subjected to the incineration treatment, a problem occurs in that a corrosive gas, for example, a chlorine-based gas, hydrogen sulfide, and sulfurous acid gas, is generated during the treatment and, therefore, treatment equipment is corroded and damaged. In particular, it is said that when a compound containing a halogen element, for example, chlorine, is subjected to the incineration treatment, dioxin is generated and, therefore, an influence exerted upon the environment becomes an important problem. Furthermore, when waste containing highly volatile metal elements, for example, alkali metals, lead, and zinc, is subjected to the incineration treatment, a problem occurs in that the metals are volatilized during the treatment and, therefore, these metals adhere to the treatment equipment or form low melting point compounds so as to corrode the treatment equipment. Consequently, periodic maintenance is required.

On the other hand, from the viewpoint of making effective use of the combustible waste as a resource, a technique using the waste plastic and shredder residue among the urban refuse and industrial waste as a fuel of a furnace has been suggested. For example, there is a technique for using the waste plastic and shredder residue as a fuel of a smelting furnace, such as an arc furnace, etc., for manufacturing steel. However, when large quantities of waste plastic and shredder residue are put in at a time, since gasification and combustion are performed in a short time, there have been problems in that the efficiency of heat conduction to iron scrap and the efficiency of reaction with molten steel have been degraded. Furthermore, when gasification and combustion are performed in a short time, control of the combustion temperature and the quantity of unburned gases become difficult and, therefore, the temperature in the furnace may be increased rapidly, and large quantities of unburned gases may be brought about in the furnace. In this case, although combustion is performed in a secondary combustion chamber installed in the latter part of the arc furnace, there have been problems in that when the quantity of the unburned gases has been large, explosion has occurred, or complete combustion has not been achieved and toxic gases have been generated.

In addition, a technique, in which the waste plastic and shredder residue are blown into a blast furnace as a fuel alternative to coke, has been suggested. However, since the waste plastic and shredder residue are mixture of waste having various chemical compositions, heating values are not uniform and, therefore, it has been required to properly control the quantity of blowing in order to keep the heating value stable. However, it has been very difficult to control the quantity of blowing in order to keep the heating value by combustion constant, and a problem has been occurred in that the heating value has been increased excessively and, therefore, the inside of the furnace has been damaged.

Regarding effective use of the combustible waste as the resource, when combustible waste containing chlorine, such as a vinyl chloride-based resin, combustible waste containing sulfur, and combustible waste containing a highly volatile metal element, etc., are put in the furnace, since the inside of the furnace is damaged by an exhaust gas generated, and adhesion of a metal, or the like is brought about, it has been necessary to remove beforehand the combustible waste containing such an element. However, such a separation is very difficult in practical operation.

In recent years, a method, in which the combustible waste is treated using a gasification melting furnace, has been suggested. However, for example, regarding a shaft furnace type gasification melting furnace, since a melting zone which reaches 1,700° C. to 1,800° C. is located at the bottom portion of the furnace, an auxiliary fuel, e.g., coke and heavy oil, is required and, therefore, the treatment cost is increased. Furthermore, since it is difficult to keep the heating value by combustion constant, there have been problems in that a molten material has been solidified due to shortage of the quantity of heat, or a refractory material has been damaged because of becoming in an overheated condition. On the other hand, a rotary kiln type gasification melting furnace is an external heating type furnace and, therefore, the heat transfer efficiency is low, and it is difficult to heat uniformly. Consequently, tar and undecomposed materials generated by thermal decomposition may cover the heat transfer surface and, therefore, the heat transfer efficiency may be further degraded, or conversely, the refractory material may be damaged because of increase in temperature. Furthermore, there has been a problem in that since the external heating type has a low heat transfer efficiency, upsizing of the furnace cannot be avoided.

A gasification treatment apparatus for waste, which has been provided with a fluidized bed gasification furnace and a melting furnace, has been suggested as an apparatus for producing a combustible gas from waste. In this technique, waste is roughly separated into high-calorie waste and low-calorie waste, and the heating value in the furnace is kept constant by mixing them. However, regarding a mixture of waste having different component compositions, separation in accordance with the exothermic calorie is difficult and, therefore, the problem that a molten material is solidified in the furnace due to shortage of the quantity of heat, or a refractory material is damaged because of excessive increase in temperature cannot be overcome.

Since a high-temperature exhaust gas is generated when the combustible waste is burned, if heat is recovered from the exhaust gas, it becomes possible to make effective use of the resource. However, when the combustible waste is burned, corrosive gases derived from chlorine and sulfur may be generated, gases containing metal elements, for example, alkali metals, lead, and zinc, may be generated and, therefore, heat recovery at a high temperature has been difficult. Consequently, hitherto, it has been attempted to cool initially the high-temperature exhaust gas to on the order of 400° C. to 650° C. and, thereafter, to generate electric power by the use of a gas heated by heat exchange with the resulting cooled exhaust gas. However, the enthalpy of vapor is low and, therefore, upsizing of the boiler has not been able to avoid. When heat is recovered from a corrosive exhaust gas, since chloride, etc., are adhered in the heat exchanger, in many cases, there is no other choice but to adopt a plate type structure and, therefore, cost reduction in the heat exchange apparatus cannot be expected. Furthermore, when the heat exchanger has been used for a long time, it has been necessary to use an expensive material having superior corrosion resistance, for example, stainless steel containing a high portion of Ni and a cobalt alloy, and to clean up at frequent intervals.

SUMMARY OF THE INVENTION

The present invention was made in consideration of the aforementioned circumstances. Accordingly, it is an object of the present invention to provide a method for combustion treatment capable of efficiently treating combustible waste, and to provide a combustion treatment apparatus capable of realizing such a method.

It is another object of the present invention to provide a method for combustion treatment capable of efficiently treating even combustible waste containing a generation source of a volatile hazardous component, and to provide a combustion treatment apparatus capable of realizing this.

Furthermore, it is another object of the present invention to provide a method for combustion treatment capable of efficiently recovering and making effective use of heat of an exhaust gas discharged during a treatment of combustible waste, and to provide a combustion treatment apparatus capable of realizing this.

A method for combustion treatment of combustible waste according to the present invention, which has been able to achieve the aforementioned objects, includes the step of combustion-treating the combustible waste with a rotary hearth furnace. When the aforementioned method for combustion treatment further includes the steps of supplying an oxygen-containing gas for secondary combustion to burn a combustible gas generated by thermal decomposition of the aforementioned combustible waste in the neighborhood of a hearth of the aforementioned rotary hearth furnace and, in addition, reducing fluctuation in the heating value by combustion of the aforementioned combustible gas by controlling the quantity of supply of the aforementioned oxygen-containing gas for secondary combustion at a modest level at the upstream side in the combustion region of the aforementioned combustible gas, and burning substantially the aforementioned combustible gas by supplying adequately the aforementioned oxygen-containing gas for secondary combustion at the downstream side, the combustible waste can be combustion-treated efficiently. It is also a preferable mode to further include the step of reducing fluctuation in the heating value by combustion of the aforementioned combustible gas by controlling the quantity of supply of the oxygen-containing gas for secondary combustion at a modest level in the aforementioned combustion region.

In the method for combustion treatment of combustible waste according to the present invention, when the steps of installing at least two exhaust gas outlets in the aforementioned combustion region, and drawing an exhaust gas generated in the furnace through each of the outlets are included, further effect can be attained. Preferably, the steps of (1) cooling the exhaust gas from the outlet installed at the upstream side in the aforementioned combustion region, supplying to a heat exchanger, and performing heat recovery and, in addition, performing heat recovery from the exhaust gas from the outlet installed at the downstream side in the aforementioned combustion region at a temperature higher than the heat recovery temperature at the upstream side, and (2) cooling the exhaust gas from the outlet installed at the upstream side in the aforementioned combustion region, supplying to a heat exchanger, preheating a gas, mixing the resulting preheated gas and the exhaust gas from the outlet installed at the downstream side in the aforementioned combustion region, and performing heat recovery from the resulting gas mixture are included.

The method for combustion treatment of combustible waste according to the present invention can be adopted even when the aforementioned combustible waste generates a volatile hazardous component by heat reduction or thermal decomposition. In this case, preferably, the steps of installing a preheating zone on the side further upstream from the aforementioned combustion region, performing a separation treatment of the volatile hazardous component in the preheating zone and, in addition, drawing a generated exhaust gas containing the hazardous component from the preheating zone are included.

On the other hand, a combustion treatment apparatus for combustible waste according to the present invention, which has been able to achieve the aforementioned objects, is a rotary hearth furnace for treating combustible waste, including an oxygen-containing gas supply device for secondary combustion in order to burn a combustible gas generated by thermal decomposition of the aforementioned combustible waste in the neighborhood of a hearth of the aforementioned rotary hearth furnace, and a control device for controlling the quantity of supply of the oxygen-containing gas for secondary combustion in the combustion region of the aforementioned combustible gas.

The combustion treatment apparatus for combustible waste according to the present invention is preferably provided with at least two exhaust gas outlets in the aforementioned combustion region, and a device for recovering heat from an exhaust gas from each of the outlets. In this case, (3) a configuration provided with a device for cooling the exhaust gas from the outlet installed at the upstream side in the aforementioned combustion region, a device for recovering heat from the resulting cooled exhaust gas, and a device for recovering heat from the exhaust gas from the outlet installed at the downstream side in the aforementioned combustion region, and a configuration provided with a device for cooling the exhaust gas from the outlet installed at the upstream side in the combustion region, a device for preheating a gas by the heat from the resulting cooled exhaust gas, a device for mixing the gas preheated by the preheating device with the exhaust gas from the outlet installed at the downstream side in the aforementioned combustion region, and a device for recovering heat from the resulting gas mixture are recommended.

Furthermore, when the aforementioned combustible waste contains a generation source of a volatile hazardous component, by installing a preheating zone on the side further upstream from the aforementioned combustion region and installing an outlet for discharging an exhaust gas containing a volatile hazardous component generated in the preheating zone, further effect can be brought about.

When the aforementioned configurations are adopted, the method for combustion treatment capable of efficiently treating combustible waste, and the combustion treatment apparatus capable of realizing such a method can be provided.

In the present invention, the method for combustion treatment capable of efficiently treating even combustible waste containing a generation source of a volatile hazardous component, and the combustion treatment apparatus capable of realizing this can be provided.

Furthermore, in the present invention, the method for combustion treatment capable of efficiently recovering and making effective use of the heat of an exhaust gas discharged during a treatment of combustible waste, and the combustion treatment apparatus capable of realizing this can be provided.

DESCRIPTION OF THE PREFERRED EMBODIMENTS

Figure 1:
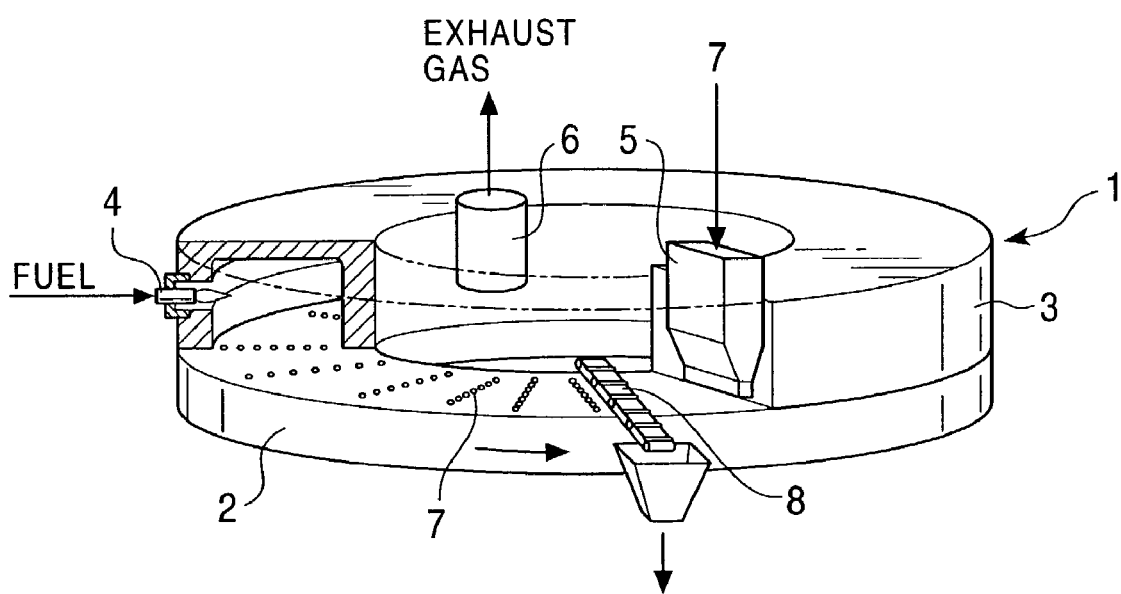
FIG. 1 is a schematic diagram of an apparatus for explaining a rotary hearth furnace used in the present invention.

In order to overcome the aforementioned problems, the inventors of the present invention have performed research from various angles. As a result, it has been found out that in the combustion treatment of combustible waste, the treatment has been able to perform efficiently when a rotary hearth furnace has been used and, therefore, the present invention has been completed. The actions and advantages of the present invention will be described below with reference to the drawings. However, the present invention is not essentially limited to these examples shown in the drawings, and various design changes based on the purport of the above and following description are included within the technical scope of the present invention. The constituents common to each drawing are indicated by the same reference numerals and, therefore, duplication of explanations is avoided.

Figure 2:
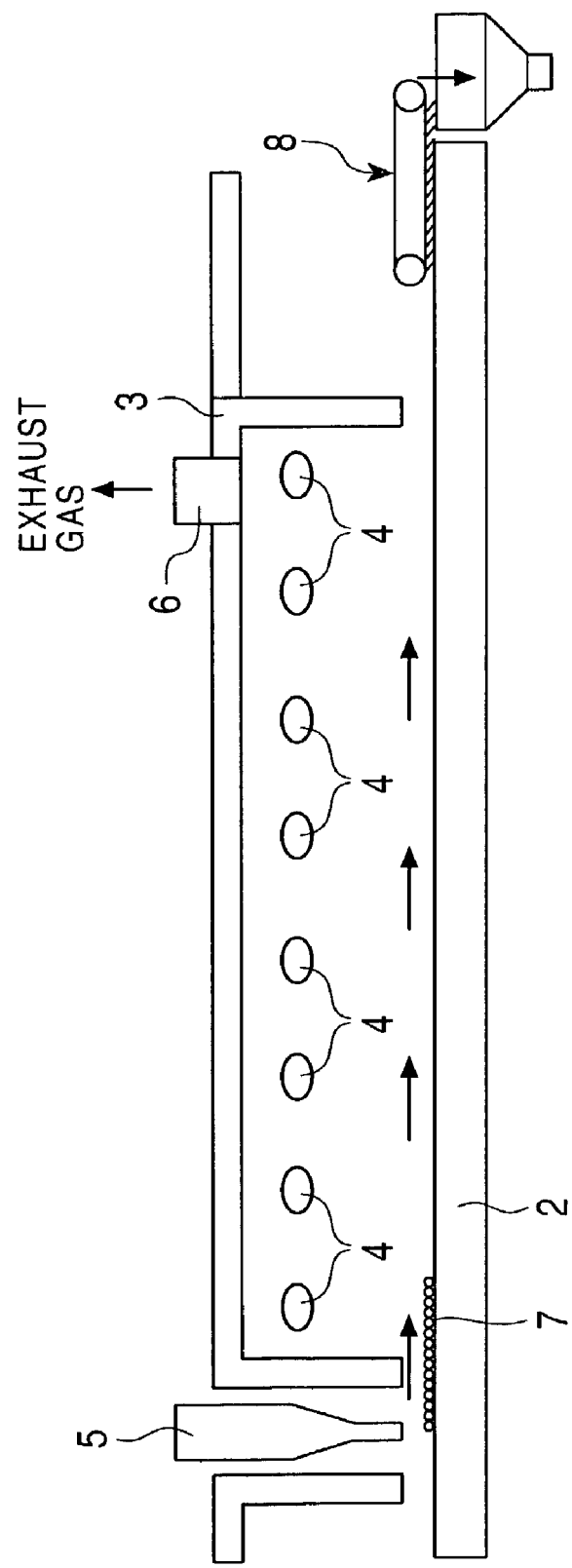
FIG. 2 is a developed view of FIG. 1 developed along the movement direction of a hearth.

FIG. 1 is a schematic diagram of an apparatus for explaining a rotary hearth furnace used preferably in the present invention, and for convenience in understanding, a part thereof is indicated by chain-double dashed lines. FIG. 2 is a drawing of FIG. 1 developed along the movement direction of a hearth 2. A rotary hearth furnace 1 is composed of a doughnut-shaped rotary hearth 2 and a furnace body 3 for covering the rotary hearth 2, and the aforementioned rotary hearth 2 rotates (rotation on its axis) at a proper speed by a drive device, although not shown in the drawing. A plurality of combustion burners 4 are installed on the furnace body 3, and the temperature in the furnace is controlled by the heat from the combustion burners 4.

FIG. 2 shows the case where eight units of combustion burners 4 are installed. However, the number of the combustion burners is not limited to this, and can be changed appropriately in accordance with the size of the rotary hearth furnace 1 equipment and necessity.

The method for combustion treatment of combustible waste according to the present invention uses the rotary hearth furnace for combustion treatment of the combustible waste. When the combustible waste 7, which is the target for the treatment, is put into the furnace through a supply port 5, the aforementioned combustible waste 7 undergoes a combustion treatment by the heat from the aforementioned combustion burners 4 and radiation heat while the location thereof in the rotary hearth furnace 1 is changed. Subsequently, the combustible waste is burned and is drawn through an outlet 6 as an exhaust gas and, in addition, the residue remaining as noncombustible materials is discharged to outside the system by a discharge device 8. Consequently, in the present invention, by properly adjusting the quantity of supply of the combustible waste 7 put into the furnace, the temperature in the furnace, and the movement speed (rotation speed) of the hearth, the combustible waste 7 can be combustion-treated completely in the rotary hearth furnace 7. In the present invention, since the rotary hearth furnace is used for the combustion treatment of the combustible waste, the hearth 2 itself is also heated while the hearth 2 goes into a 360-degree rotation in the furnace. Since next target for the treatment is supplied on the heated hearth 2 through the supply port 5, the heat of the hearth 2 can be used without wastage.

When the present invention is put into practice, it is recommended to control the quantity of the combustible waste supplied on the hearth 2 by the thickness. Specifically, a method, in which the interval between the tip of the supply port 5 and the hearth 2 is adjusted properly, a method, in which a rotary leveling apparatus (leveler) is installed, can be exemplified (not shown in the drawing). According to the inventors of the present invention, it has been confirmed to be effective that the thickness of the combustible waste 7 to be supplied on the hearth 2 has been specified to be about 100 mm or less from the surface of the hearth 2, and more preferably, be about 50 mm or less in order to heat uniformly the combustible waste 7 supplied on the hearth 2.

In the present invention, it is effective that the oxygen-containing gas for secondary combustion to burn the combustible gas generated by thermal decomposition of the combustible waste is supplied in the neighborhood of the hearth 2 of the rotary hearth furnace 1 and, in addition, fluctuation in the heating value by combustion of the aforementioned combustible gas is reduced by controlling the quantity of supply of the aforementioned oxygen-containing gas for secondary combustion at a modest level at the upstream side in the combustion region of the aforementioned combustible gas, and the aforementioned combustible gas is substantially completely burned by supplying adequately the aforementioned oxygen-containing gas for secondary combustion at the downstream side. When operation is performed as described above, damage to the inside of the furnace can be reduced and the combustible waste can be combustion-treated efficiently. This will be described using the drawings.

Figure 3:
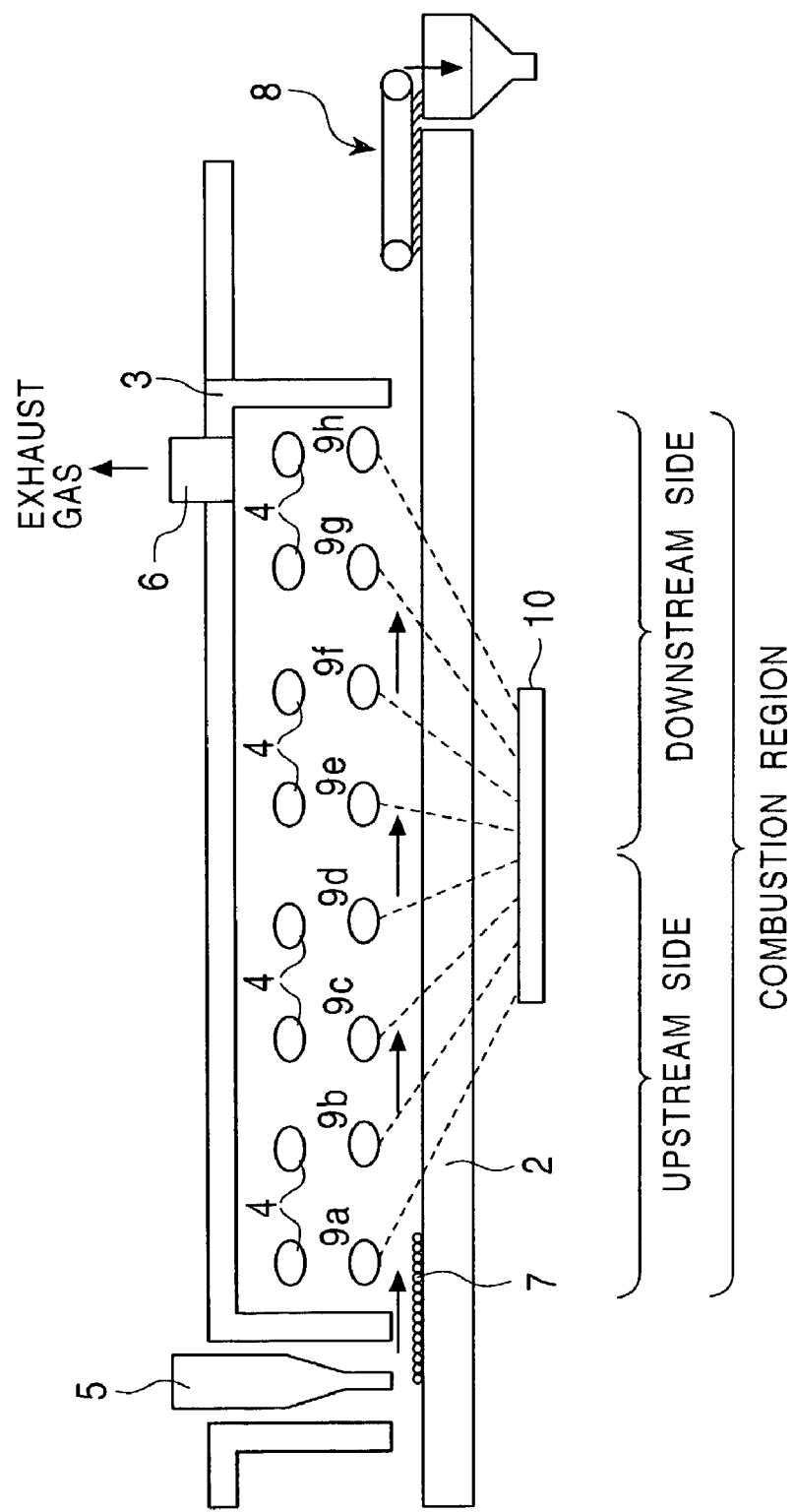
FIG. 3 is a developed view of a rotary hearth furnace showing another configuration example according to the present invention.

FIG. 3 is a developed view of a rotary hearth furnace showing another configuration example according to the present invention, and in addition to the configuration shown in FIG. 2, oxygen-containing gas supply devices 9a to 9h for secondary combustion to burn the combustible gas generated by thermal decomposition of the combustible waste 7 and a control device 10 for controlling the quantity of supply of the aforementioned oxygen-containing gas for secondary combustion are installed in the neighborhood of the rotary hearth 2. In FIG. 3, as an example, the total range, in which combustion burners 4 are provided, is specified to be a combustion region, the upstream side in the combustion region is specified to be the range corresponding to the oxygen-containing gas supply devices 9a to 9d for secondary combustion, and the downstream side in the aforementioned combustion region is specified to be the range corresponding to the oxygen-containing gas supply devices 9e to 9h for secondary combustion.

The number of the combustion burners and the number of the oxygen-containing gas supply devices for secondary combustion corresponding to the aforementioned ranges of the upstream side and downstream side are not specifically limited, and can be set arbitrarily in consideration of the scale and capacity of the rotary hearth furnace. In the present invention, after the combustible waste put into the furnace is heated to some extent by the combustion burners, it is also possible to stop the use of the combustion burners and to adjust the temperature in the furnace by controlling the quantity of the oxygen-containing gas for secondary combustion ("oxygen-containing gas for secondary combustion" will be described later).

When various chemical component materials are mixed in the combustible waste, the heating value of the combustible waste 7 is fluctuated and, therefore, refractory materials may be damaged because the inside of the furnace becomes in an overheated condition, and discharge to outside the system may be performed while some parts, which are not yet combustion-treated, are included because of inadequate combustion treatment. The inventors of the present invention made research regarding the method for reducing the fluctuation in the heating value during combustion treatment in order to further efficiently combustion-treat the combustible waste 7 by the use of the rotary hearth furnace 1. As a result, it was found out that when the oxygen-containing gas for secondary combustion to burn the combustible gas generated by thermal decomposition of the combustible waste 7 was supplied in the neighborhood of the hearth 2 of the rotary hearth furnace 1 and, in addition, the quantity of supply of the oxygen-containing gas for secondary combustion was controlled, the fluctuation in the heating value due to the combustible waste was able to reduce. This will be described using the drawings.

Figure 4:
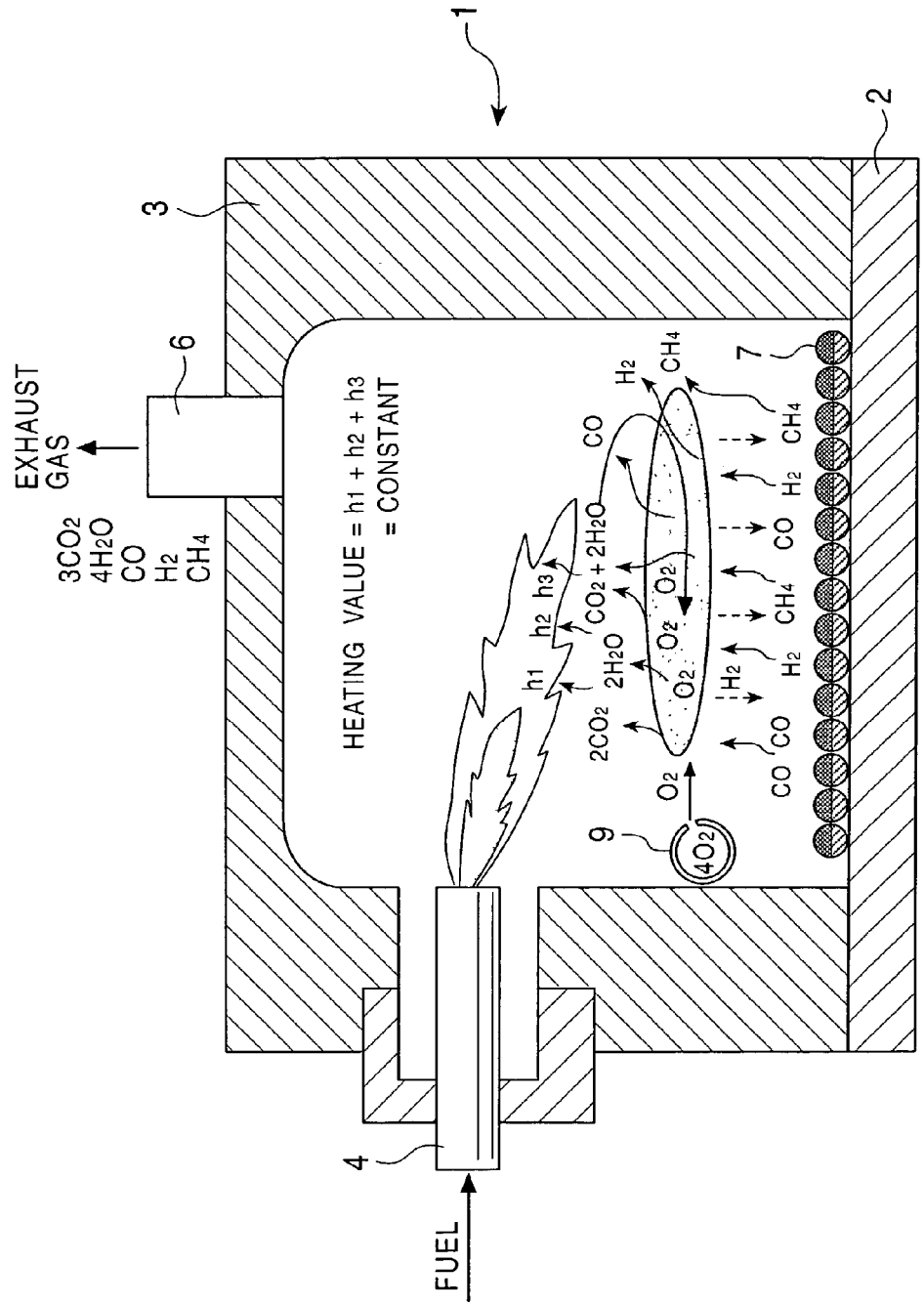
FIG. 4 is a sectional view of an apparatus when a rotary hearth furnace is cut in the direction perpendicular to the movement direction of the hearth.

FIG. 4 is a sectional view of an apparatus when the rotary hearth furnace 1 shown in FIG. 1 is cut in the direction perpendicular to the movement direction of the hearth 2, and an oxygen-containing gas supply device 9 for secondary combustion is installed in the neighborhood of the hearth 2. The combustible waste 7 undergoes thermal decomposition and is gasified by the heat from a combustion burner 4 and radiation heat in the rotary hearth furnace 1 as described above. Among the resulting gas components, combustible gases (CO, $H_2$, and $CH_4$ in the drawing) are burned by oxygen existing in the furnace. Since heat of combustion (indicated by $h_1$, $h_2$, and $h_3$ in the drawing) is generated during combustion, the heat of combustion further accelerates heating of the combustible waste 7 and, therefore, the treatment efficiency is increased. Herein, in order to completely burn the combustible gases generated from the combustible waste 7, it is considered to supply adequate amount of oxygen-containing gas into the furnace. However, as described above, since in the majority of cases, materials having various chemical compositions are mixed in the combustible waste 7, the composition of the gas component generated and the quantity of the gas generated are not constant, and in accordance with this, the total amount of heat generated fluctuates by a large degree. Accordingly, the inventors of the present invention made considerable research in order to stabilize the heating value by combustion of the combustible waste 7, and as a result, succeeded in controlling the total heating value and controlling the temperature in the furnace by controlling the quantity of supply of the oxygen-containing gas for secondary combustion. That is, it was found out that as long as the quantity of supply of the oxygen-containing gas for secondary combustion was controlled to be equivalent to or less than the combustible gas generated in that region, the heating value by combustion in that region became nearly constant.

Therefore, in the present invention, "a modest level" refers to supply the oxygen-containing gas for secondary combustion to the extent that the heating value generated by combustion of the combustible waste put into the furnace is not increased excessively. That is, when the quantity of the combustible waste 7 put into the furnace is reduced, the quantity of combustible gases generated from the combustible waste is reduced, and although complete combustion may be brought about by the oxygen-containing gas for secondary combustion supplied at a modest level, it does not occur that the inside of the furnace is damaged due to a heating value increased excessively. On the other hand, when the quantity of the combustible waste 7 put into the furnace is increased, the quantity of combustible gases generated from the combustible waste is also increased, although a part of the combustible gases remain in the condition of being unburned due to the oxygen-containing gas for secondary combustion being supplied at a modest level and, therefore, the heating value in that region is maintained to be nearly constant. Consequently, it does not occur that the refractory in the furnace is damaged due to excessive increase in temperature of this part.

The composition of the combustible gas generated from the combustible waste and the gas components to be burned among the generated combustible gases vary slightly depending on the temperature in the furnace, the quantity of supply of the oxygen-containing gas for secondary combustion, etc. However, in the present invention, the range of fluctuation of the heating value can be made very small compared to that in the conventional case where the quantity of oxygen supplied into the furnace is made to be equivalent or be excessive.

The combustible gases remaining in the condition of being unburned is completely burned by supplying adequate quantity of oxygen-containing gas for secondary combustion from the oxygen-containing gas supply devices 9e to 9h for secondary combustion installed at the downstream side and, in addition, the combustible gases generated from the combustible waste 7 at the downstream side are also burned, and finally, all combustible gases can be burned completely.

The combustion exhaust gas is discharged through the outlet 6 to outside the furnace, although is discharged into atmosphere after being subjected to a proper treatment (not shown in the drawing) in accordance with the emission standard.

Regarding the present invention, it is a preferable mode that in the configuration shown in FIG. 3, the fluctuation in the heating value by combustion of the aforementioned combustible gases is reduced by controlling the quantity of supply of the oxygen-containing gas for secondary combustion at a modest level in the total range of the aforementioned combustion region as well. That is, although when the combustible waste 7 is put into the furnace through the supply port 5, combustible gases are generated from the combustible waste 7 by the heat from the combustion burner 4 and radiation heat, the heating value in the total range of the furnace can be controlled by discharging the combustible gases to outside the system as an exhaust gas containing large quantities of unburned gases while the combustible gases are not burned completely in the furnace. In this case, it is better that the exhaust gas containing the unburned gases is supplied to a secondary combustion device, although not shown in the drawing, through the outlet 6, and is burned completely in the secondary combustion device.

Figure 5:
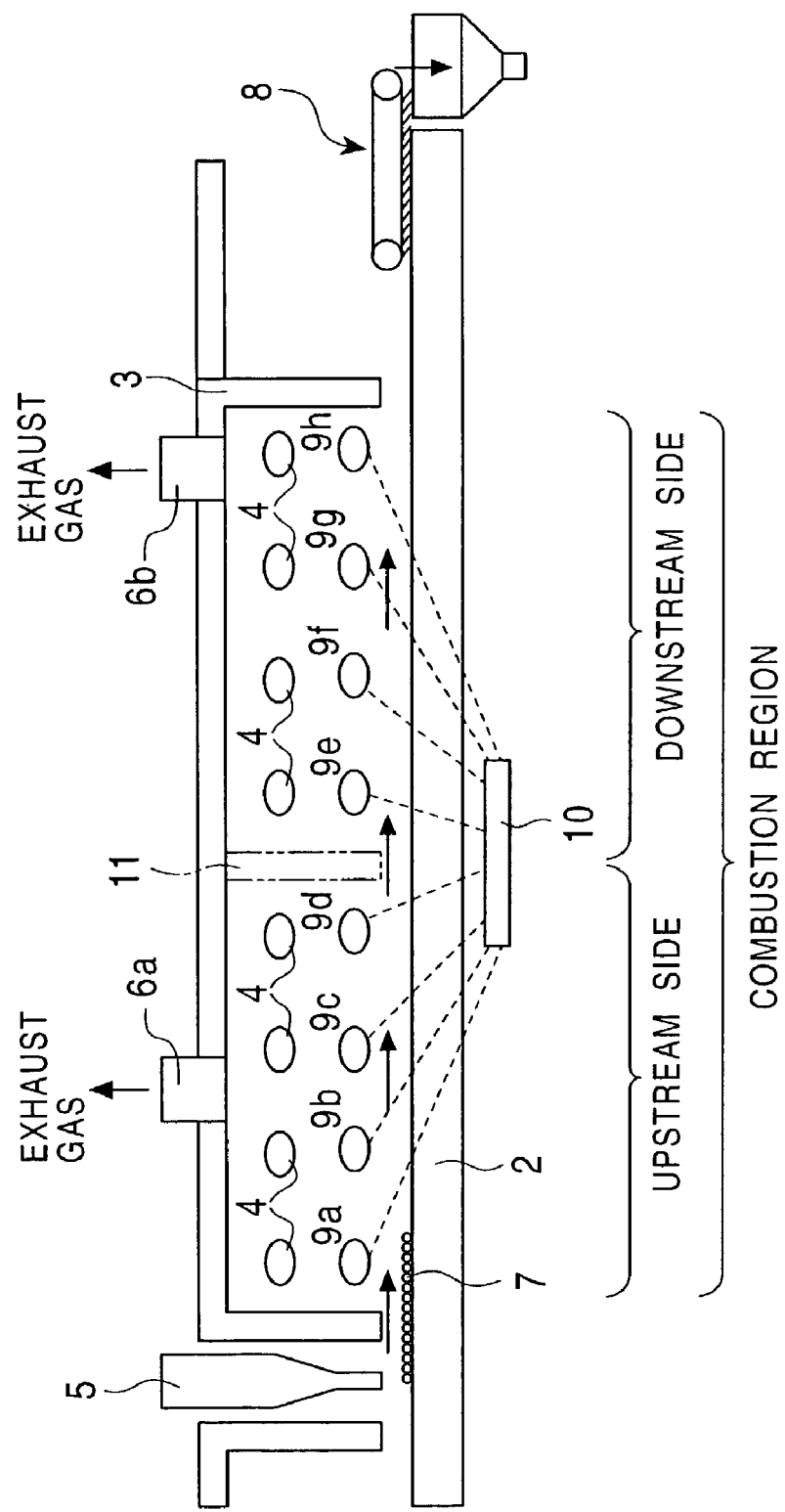
FIG. 5 is a developed view of a rotary hearth furnace showing another configuration example according to the present invention.

FIG. 5 is a developed view of a rotary hearth furnace showing another configuration example according to the present invention, and another outlet 6a of the exhaust gas is installed in the combustion region in addition to the configuration shown in FIG. 3. Then, the exhaust gas generated at the upstream side in the combustion region is drawn to outside the system through the outlet 6a, and the exhaust gas generated at the downstream side in the combustion region is discharged to outside the system through the outlet 6b. As described above, the exhaust gases generated at individual positions in the furnace can be recovered selectively by installing a plurality of exhaust gas outlets in the combustion region. Consequently, in the present invention, even when the combustible waste contains highly volatile metal elements, for example, alkali metals (Na, K, etc.), zinc, and lead, and elements which bring about generation of corrosive gases (for example, chlorine and sulfur), it is possible to control materials to be volatilized from the combustible waste by controlling the temperatures at individual positions in the furnace and the quantity of supply of the oxygen-containing gas for secondary combustion and, therefore, the individual volatilized materials can be drawn separately as exhaust gases through the plurality of outlets installed.

In this case, by installing suction devices, although not shown in the drawing, on the outlets 6a and 6b, respective exhaust gases generated at the upstream side and the downstream side can be discharged separately to outside the furnace as well. Furthermore, since in many cases, unburned gases are contained in the exhaust gas from, especially, upstream side in the combustion region, it can be recommended that the exhaust gas discharged through the outlet 6a is supplied to a secondary combustion device, although not shown in the drawing, and is completely burned.

Herein, the secondary combustion device put into practice in the present invention is not specifically limited as long as it is a device capable of completely burning unburned gases. Examples thereof include a method, in which the exhaust gas from the rotary hearth furnace 1 is supplied to afterburning equipment, and is burned completely in the equipment, and the like. In this case, as was suggested previously by the inventors of the present invention (Japanese Patent Application No. 2000-94110), it is effective that an air-blowing nozzle is installed at the upper portion of a temperature control tower, and complete combustion of the unburned gas and temperature control are performed simultaneously as well.

In order to recover separately the respective exhaust gases generated at the upstream side and the downstream side with ease, it is also recommended that, as indicated by alternate long and short dashed lines shown in FIG. 5, a partition plate 11 is installed vertically from a ceiling portion and, therefore, the upstream side and the downstream side are separated. According to this, temperatures at individual positions in the furnace can be controlled with ease.

Next, the case where the combustible waste generates volatile hazardous components by heat reduction or thermal decomposition will be described.

When the combustible waste containing alkali metal elements and elements, for example, zinc and lead, undergoes a combustion treatment, these elements are volatilized by heat reduction and thermal decomposition, and are discharged to outside the system together with the exhaust gas. In this case, as described above, when the exhaust gas containing the aforementioned elements is cooled outside the system, problems of adhesion to apparatuses (for example, a heat exchanger) installed outside the system, etc., occur. As is also described above, when the combustible waste containing elements, for example, chlorine and sulfur, undergoes the combustion treatment, a problem occurs in that a chlorine-based gas, hydrogen sulfide, sulfurous acid gas, etc., are generated by thermal decomposition and heating and, therefore, the apparatuses are corroded. It is also described above that in the present invention, the hazardous components which bring about the aforementioned problems can be generated selectively by controlling the temperature of the combustion region, and the hazardous components can be recovered efficiently by installing the plurality of outlets in the combustion region.

As the result of further research by the inventors of the present invention, it was made clear that when the combustible waste containing a high proportion of elements, which brought about such hazardous components, underwent the combustion treatment in the rotary hearth furnace, by installing a preheating zone on the side further upstream from the aforementioned combustion region, performing a separation treatment of the volatile hazardous component in the preheating zone and, in addition, drawing a generated exhaust gas containing the volatile hazardous component from the preheating zone, the combustion treatment was able to perform efficiently. This will be described using the drawings.

In the present invention, "volatile hazardous component" refers to a metal element or a corrosive gas which is volatilized by heat reduction or thermal decomposition during combustion treatment of the combustible waste, and specifically, refers to a highly volatile metal, for example, an alkali metal, zinc, and lead, and a corrosive gas which is a compound of, for example, chlorine and sulfur. The exhaust gas containing these components can also be recovered as a secondary resource in treatment equipment installed separately.

Figure 6:
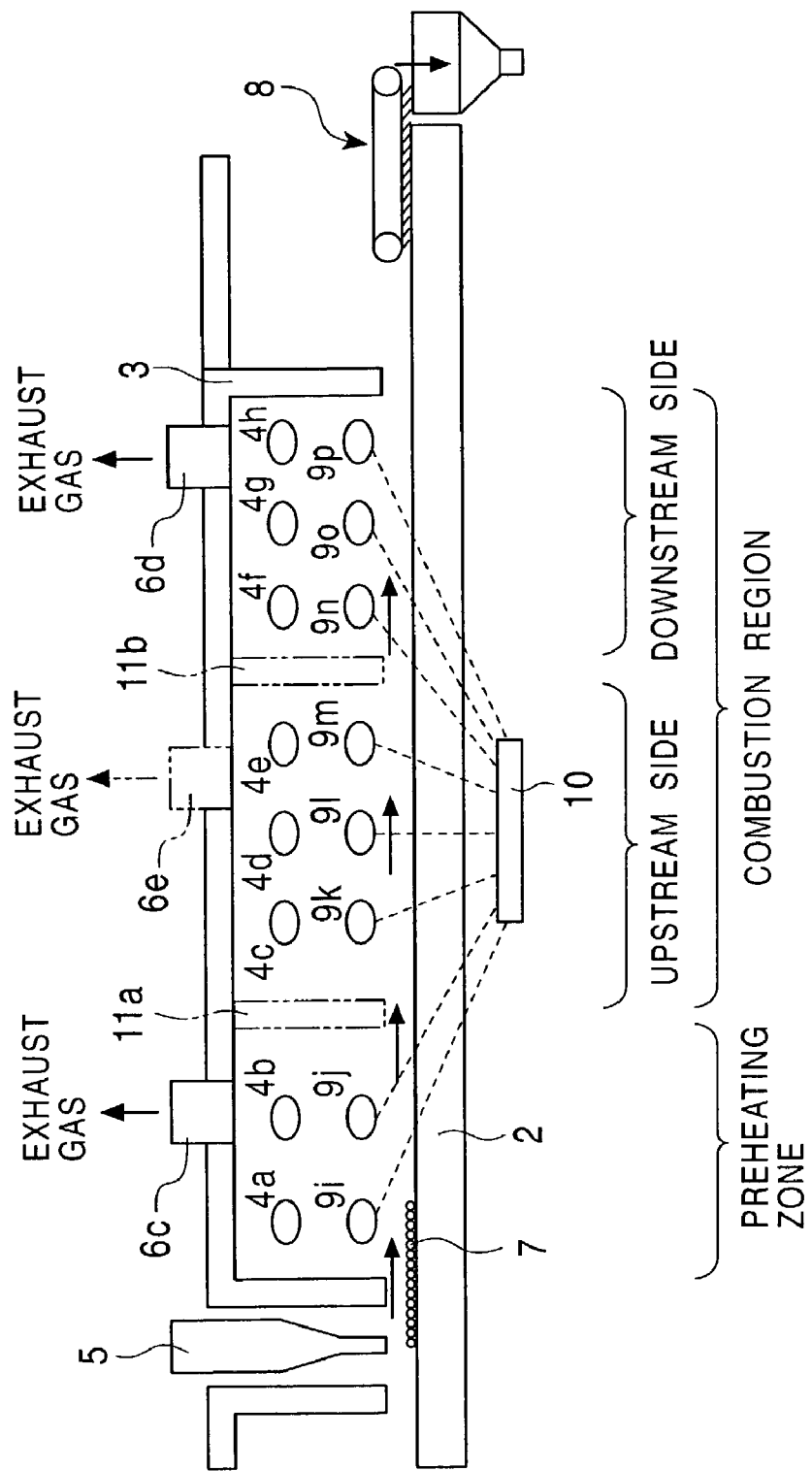
FIG. 6 is a developed view of a rotary hearth furnace showing another configuration example according to the present invention.

FIG. 6 is a developed view of a rotary hearth furnace showing another configuration example according to the present invention, and in addition to the configuration shown in FIG. 2, oxygen-containing gas supply devices 9i to 9p for secondary combustion to burn the combustible gas generated by thermal decomposition of the combustible waste 7 and a control device 10 for controlling the quantity of supply of the oxygen-containing gas for secondary combustion are installed in the neighborhood of the rotary hearth 2. In FIG. 6, as an example, the range, in which combustion burners 4a to 4b are provided, is specified to be a preheating zone, and the range, in which combustion burners 4c to 4h are provided, is specified to be a combustion region of the combustible gas. The upstream side in the aforementioned combustion region is specified to be the range corresponding to the oxygen-containing gas supply devices 9k to 9m for secondary combustion, and the downstream side in the aforementioned combustion region is specified to be the range corresponding to the oxygen-containing gas supply devices 9n to 9p for secondary combustion. In FIG. 6, an outlet 6c for discharging the exhaust gas generated in the preheating zone and an outlet 6d for discharging the exhaust gas generated in the combustion region are installed.

According to this example shown in the drawing, even when the combustible waste 7 contains a high proportion of generation sources of volatile hazardous components, by performing a separation treatment in the preheating zone and, thereafter, performing a combustion treatment in the combustion region, the aforementioned problems can be overcome excellently. This will be described using the example of the case where the combustible waste contains chlorine which is one of generation sources of volatile hazardous components.

Since chlorine is a flame-retardant material, the waste containing chlorine is unlikely to burn. However, in the present invention, chlorine can be removed intensively from chlorine-containing combustible waste by thermally decomposing components containing chlorine in the preheating zone in order to dechlorinate, and the dechlorinated combustible waste can undergo combustion treatment in the later combustion region.

In this example, since dechlorination is performed intensively in the preheating zone, damage to the inside of the furnace due to the chlorine-based exhaust gas generated can be reduced to a minimum and, therefore, the maintenance cost of the furnace can also be reduced.

Furthermore, when chlorine-based gases are contained in the exhaust gas, since discharge into atmosphere cannot be performed without further treatment because of adversely affecting the environment, a treatment for rendering them harmless, for example, a dechlorination treatment, is required. However, in the present embodiment, since the exhaust gas generated in the preheating zone is drawn through the outlet 6c, only the exhaust gas containing chlorine at a high concentration can be recovered intensively. Therefore, although the dechlorination treatment has been hitherto required with respect to every exhaust gas generated during combustion treatment of the chlorine-containing combustible waste, in the present embodiment, since the quantity of target exhaust gas to undergo dechlorination treatment can be reduced, treatment equipment can be miniaturized, and the efficiency of dechlorination treatment can also be improved. Consequently, in the present invention, even small treatment equipment can recover efficiently hydrochloric acid from the chlorine-containing exhaust gas, and the hydrochloric acid can be reused as a resource.

In this case, the temperature of the preheating zone is preferably adjusted within the range of 200° C. to 600° C. This is because chlorine-based gases rather than combustible gases can be generated intensively by adopting this temperature. Preferably, the lower limit of the temperature is 250° C., and the upper limit of the temperature is 350° C.

The temperature of the preheating zone must be kept at a relatively low temperature. In this case, the quantity of heat feed to the burner is adjusted and, in addition, preferably, the surface temperature of the hearth is also taken into consideration. That is, although the hearth in the rotary furnace is heated to a high temperature at the downstream side in the furnace, when the hearth is entered into the preheating zone while that temperature is maintained, the temperature of the preheating zone is raised due to the temperature of the hearth itself and, therefore, the aforementioned temperature range cannot be maintained. Consequently, in the present invention, it is recommended that the temperature of the hearth surface in the preheating zone is controlled with a cooling plate, etc.

The combustible waste dechlorinated in the preheating zone undergoes combustion treatment in the combustion region installed succeedingly on the side downstream from the preheating zone in a manner similar to that described above. The combustible waste dechlorinated is transferred to the upstream side in the combustion region and undergoes combustion treatment in a manner similar to that described above.

In this case, a low proportion of chlorine, which has not been able to decompose in the preheating zone, may be included in the gas discharged from the combustion region, and when this gas is burned at a low temperature, there is a possibility of generation of dioxin. Consequently, in order to avoid such a problem, the temperature of the downstream side in the aforementioned combustion region is made to be 850° C. or more, and more preferably, be 900° C. or more, by the combustion burners 4n to 4h, and the aforementioned gas is desirably held for 2 seconds or more in a chamber kept at the aforementioned temperature. According to that, the aforementioned gas can be substantially burned without generation of dioxin.

When the aforementioned gas is not completely burned at the downstream side, the exhaust gas through the outlet 6d is transferred to the secondary combustion device (for example, secondary combustion chamber), and can be burned completely here. In this case, in order to prevent generation of dioxin, it is also recommended that the temperature in the secondary combustion chamber is specified to be 850° C. or more, and more preferably, be 900° C. or more.

In the present embodiment, it is preferable that, as indicated by alternate long and short dashed lines shown in FIG. 6, a partition plate 11a is installed vertically from a ceiling portion and, according to this, the chlorine-containing exhaust gas in the preheating zone and the exhaust gas containing no chlorine generated in the combustion region can be efficiently recovered separately as well. Furthermore, in this case, it is also recommended as preferable mode that, as indicated by alternate long and short dashed lines shown in FIG. 6, a partition plate 11b is installed vertically from a ceiling portion and, in addition, an outlet 6e is installed. According to this, the upstream side and the downstream side in the combustion region can be separated, and it becomes easy to recover separately the exhaust gas generated at the upstream side through the outlet 6e, and the exhaust gas generated at the downstream side through the outlet 6d.

Since the exhaust gas generated by combustion of the combustible waste has large qualities of thermal energy at a high temperature, when this exhaust gas is supplied to the heat exchanger, the heat can be recovered. However, when the exhaust gas contains corrosive gases, for example, chlorine and hydrogen sulfide, or contains highly volatile metal elements, for example, alkali metals, lead, and zinc, the heat exchanger is degraded remarkably and, therefore, the heat recovery becomes difficult.

Figure 7:
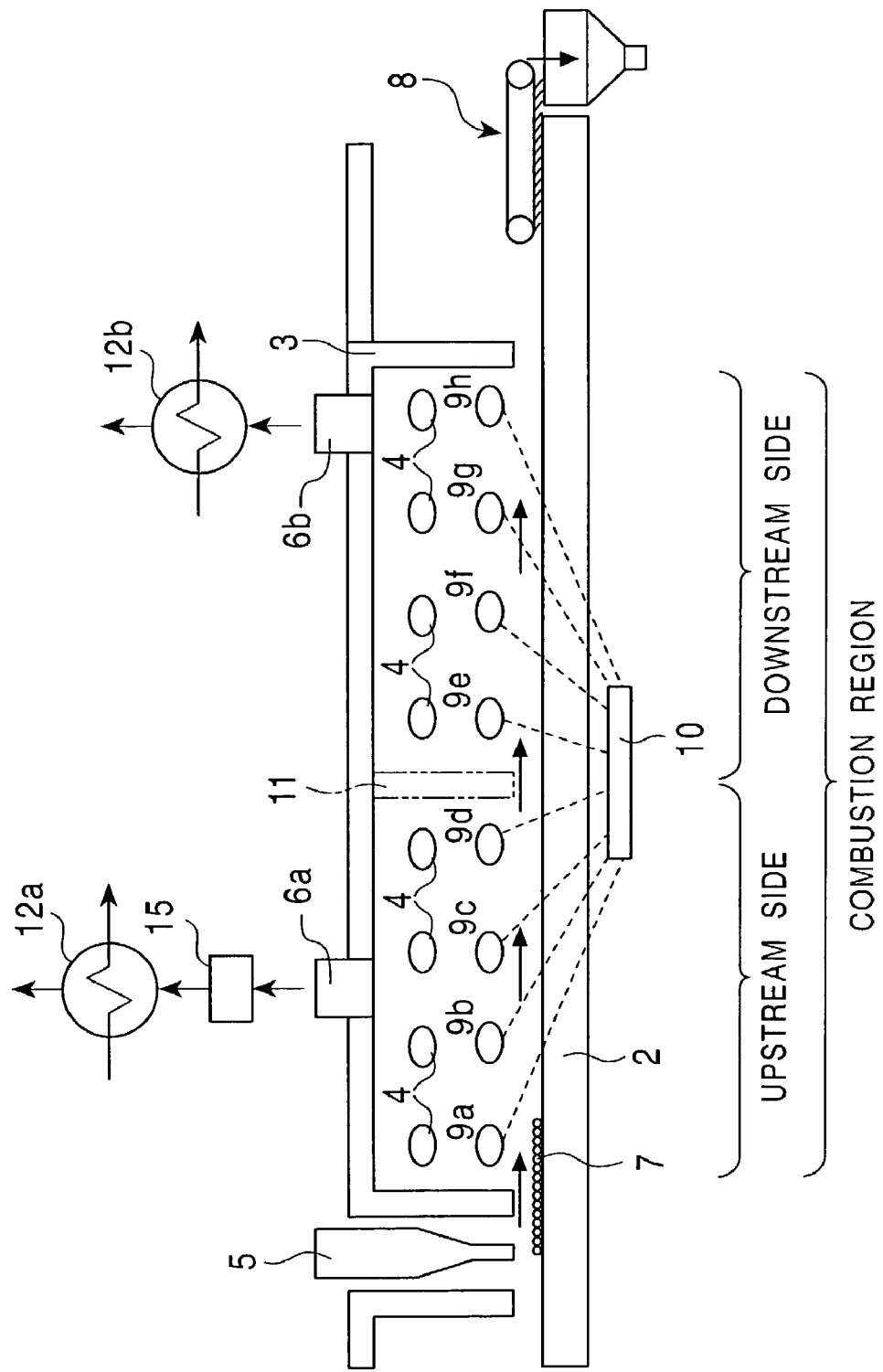
FIG. 7 is a developed view of a rotary hearth furnace showing another configuration example according to the present invention.

Accordingly, in the present invention, as shown in FIG. 7, heat recovery can be performed efficiently by installing a cooling tower 15 and heat exchangers 12a and 12b in addition to the configuration shown in FIG. 5. That is, since in many cases, the aforementioned corrosive gases and highly volatile metal elements are contained in the exhaust gas generated at the upstream side in the combustion region, by supplying the exhaust gas from the outlet 6a to the cooling tower 15, and cooling is performed to on the order of 400° C. to 650° C. in the cooling tower 15, the corrosive temperature range can be avoided, adhesion can be reduced and, therefore, heat recovery can be performed without degradation of the performance of the heat exchanger 12a. On the other hand, since the aforementioned elements are hardly contained in the exhaust gas generated at the downstream side in the combustion region, by supplying the exhaust gas into the heat exchanger 12b without further treatment or after the temperature is adjusted at on the order of 650° C. to 1400° C., heat recovery can be performed at a temperature higher than that in the recovery with the heat exchanger at the upstream side.

When the aforementioned combustible waste does not contain any generation source of the aforementioned volatile hazardous materials, since there is no need to install the cooling tower 15, the exhaust gas from the outlet 6a can also be supplied into the heat exchanger 12a while that temperature is maintained, and heat recovery can be performed.

When the combustible waste contains large quantities of generation sources of the volatile hazardous materials, heat recovery from the exhaust gas becomes more difficult. However, the present invention can meet by adopting the following method. The case where the combustible waste contains especially chlorine will be described below, although it is possible to similarly apply to the case where elements other than the aforementioned chlorine are contained.

Regarding a method according to the present invention, in a combustion treatment of chlorine-containing combustible waste by the use of a rotary hearth furnace, a preheating zone and a combustion region are installed, a chlorine-based exhaust gas generated in the preheating zone is discharged to outside the system and, in addition, at least two exhaust gas outlets are installed in the combustion region, the exhaust gas from the outlet installed at the upstream side in the aforementioned combustion region is cooled, and is supplied to the heat exchanger after the temperature is lowered to a proper temperature, a gas separately supplied to the heat exchanger is preheated by the potential heat of the resulting cooled exhaust gas, the resulting preheated gas and the exhaust gas from the outlet installed at the downstream side in the aforementioned combustion region are mixed and, therefore, heat recovery is performed from the resulting gas mixture. This method will be described using the drawings.

Figure 8:
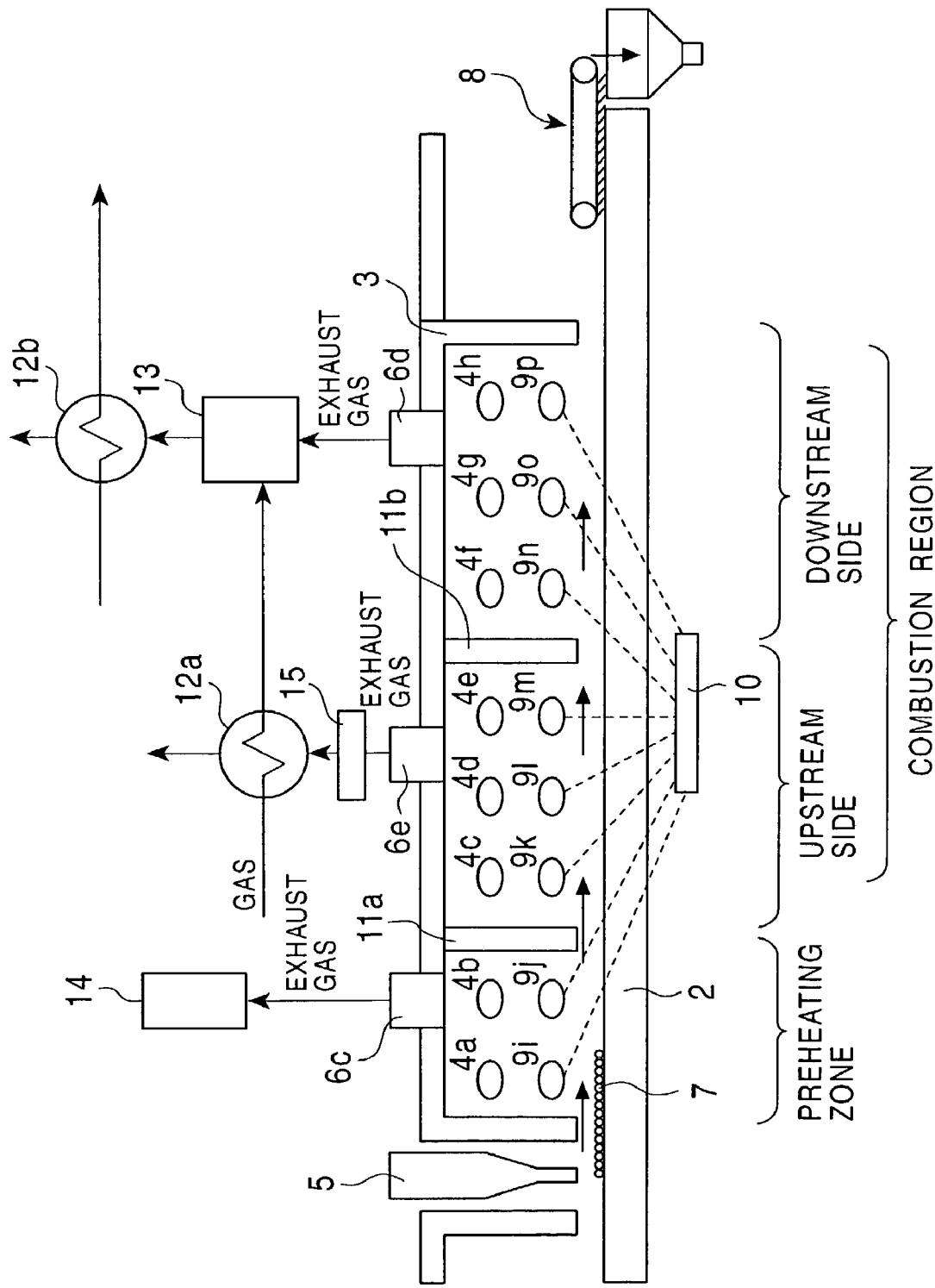
FIG. 8 is a developed view of a rotary hearth furnace showing another configuration example according to the present invention.

FIG. 8 is a developed view of a rotary hearth furnace showing a configuration example when the aforementioned method is put into practice, and in addition to the configuration shown in FIG. 2, oxygen-containing gas supply devices 9i to 9p for secondary combustion to burn the combustible gas generated by thermal decomposition of the combustible waste 7 and a control device 10 for controlling the quantity of supply of the oxygen-containing gas for secondary combustion are installed in the neighborhood of the rotary hearth 2. In FIG. 8, as an example, the range, in which combustion burners 4a to 4b are provided, is specified to be a preheating zone, and the range, in which combustion burners 4c to 4h are provided, is specified to be a combustion region of the combustible gas. The upstream side in the aforementioned combustion region is specified to be the range corresponding to the oxygen-containing gas supply devices 9k to 9m for secondary combustion, and the downstream side in the aforementioned combustion region is specified to be the range corresponding to the oxygen-containing gas supply devices 9n to 9p for secondary combustion.

In FIG. 8, partition plates 11a and 11b are installed vertically from a ceiling portion in order to individually separate the preheating zone, and the upstream side and the downstream side in the combustion region. In addition, an outlet 6c for discharging the exhaust gas generated in the preheating zone, an outlet 6e for discharging the exhaust gas generated at the upstream side in the combustion region, and an outlet 6d for discharging the exhaust gas generated at the downstream side in the combustion region are provided.

In the present embodiment, the chlorine-containing combustible waste supplied into the furnace undergoes dechlorination treatment by being heated in the preheating zone. However, an exhaust gas, which degrades the heat exchanger, is also generated at the upstream side in the combustion region. This is because chlorine not completely dechlorinated in the preheating zone remains, or highly volatile metals, etc., are discharged and, therefore, low melting point compounds are formed. Consequently, although the exhaust gas is discharged from the outlet 6e at a high temperature, it is not preferable to supply to the heat exchanger without further treatment and, therefore, cooling to on the order of 400° C. to 650° C. is performed in the cooling tower 15. Subsequently, the resulting cooled exhaust gas is supplied to the heat exchanger 12a, and the gas separately supplied to the heat exchanger 12a is preheated here. The gas preheated in the heat exchanger 12a is transferred to a mixer 13, and is mixed with the exhaust gas from the outlet 6d installed at the downstream side in the aforementioned combustion region. By this mixing, the temperature of the exhaust gas supplied to the heat exchanger 12b can be adjusted, or it becomes possible to efficiently recover the heat by the heat exchanger 12b without excessive reduction of the temperature of the exhaust gas from the outlet 6d. That is, although it is preferable to supply the exhaust gas to the heat exchanger while being at a high temperature in order to efficiently recover the heat from the exhaust gas, when the temperature is excessively high, the heat exchanger may be damaged. Consequently, the aforementioned preheated gas and the exhaust gas from the outlet 6d are mixed and, therefore, the temperature is adjusted at a proper level without reduction of the total sensible heat.

Since the chlorine concentration in the exhaust gas generated in the preheating zone is high, when this is supplied to the heat exchanger, the apparatus is corroded remarkably. Consequently, the exhaust gas from the preheating zone may be supplied separately to dechlorination equipment 14 and may undergo dechlorination treatment.

The case where the combustible waste contains chlorine has been described here. The aforementioned configuration can be adopted in the case where elements other than chlorine are contained as well. The exhaust gas containing elements, for example, sulfur, zinc, lead, and alkali metals, may be recovered intensively in the preheating zone and, in addition, heat may be recovered from the exhaust gas generated in the combustion region.

When the combustible waste contains generation sources of a plurality sorts of volatile hazardous components, it is also possible to recover on a generation source of volatile hazardous component basis by separating the preheating zone into two sections, for example, and adjusting the temperatures at individual positions.

When the combustible waste hardly contains elements, such as chlorine and sulfur, in the configuration shown in FIG. 8, the preheating zone may not be included in the configuration, and it is also possible that the exhaust gas from the outlet installed at the upstream side in the combustion region is cooled and is supplied to the heat exchanger so as to preheat the gas, the resulting preheated gas and the exhaust gas from the outlet installed at the downstream side in the combustion region are mixed and, thereafter, the heat is recovered from the resulting gas mixture.

In the present invention, when the method shown in FIG. 8 is put into practice, the target gas for preheating supplied to the aforementioned heat exchanger 12a is not specifically limited as long as it does not bring about problems, for example, corrosion. Examples thereof include, for example, combustion exhaust gases, nonoxidative gases, and oxygen-rich gases, and are typified by air.

When the combustible waste containing generation sources of the volatile hazardous materials undergoes combustion treatment by the rotary hearth furnace 1, it is important to efficiently perform the separation treatment and the combustion treatment. In this case, it has been verified that each of separation treatment and combustion treatment has been able to efficiently perform by properly controlling the method for supplying the oxygen-containing gas for secondary combustion. This will described using the drawings.

Figure 9:
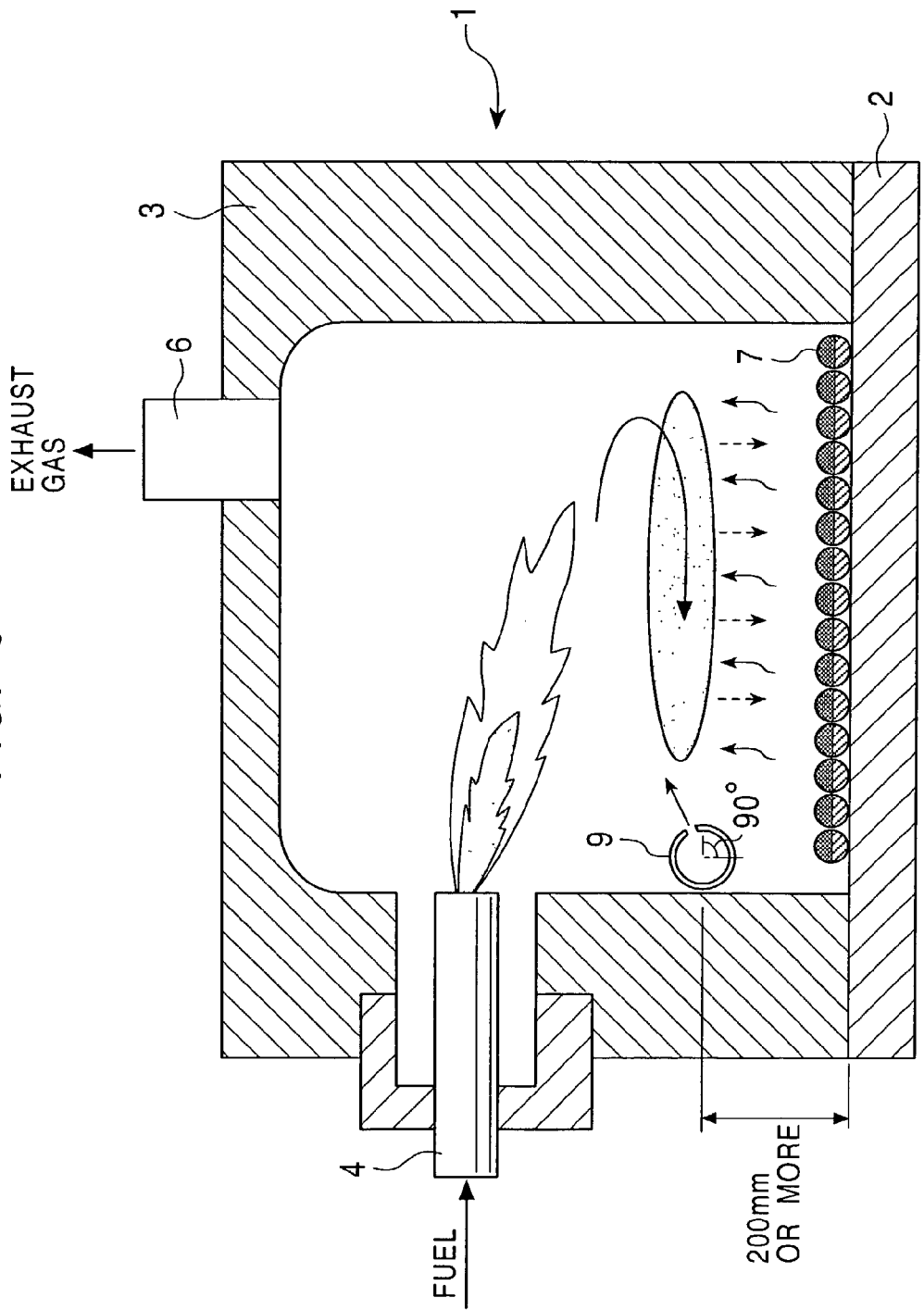
FIG. 9 is a sectional view of an apparatus when a rotary hearth furnace is cut in the direction perpendicular to the movement direction of the hearth.

FIG. 9 is a sectional view of an apparatus when a rotary hearth furnace is cut in the direction perpendicular to the movement direction of the hearth. When the combustible waste containing generation sources of the volatile hazardous materials undergoes separation treatment based on thermal decomposition in the preheating zone, preferably, as shown in FIG. 9, the nozzle installation position of the oxygen-containing gas supply device 9 for secondary combustion is specified to be 200 mm or more from the hearth 2 and, furthermore, the direction of blowing of the oxygen-containing gas is specified to be horizontal to the hearth or slightly upward the horizontal direction. According to this, since the oxygen-containing gas hardly reaches the neighborhood of the hearth 2, the oxygen potential in the neighborhood of the hearth 2 is reduced and nonoxidative atmosphere is brought about. As a result, thermal decomposition reaction of the material containing generation sources of the volatile hazardous components proceeds primarily, volatile hazardous components are generated primarily, and the gases are discharged from the outlet 6 to outside the system along the stream of the oxygen-containing gas for secondary combustion. Consequently, the quantity of the volatile hazardous components generated in the combustion region on the side downstream from the preheating zone can be reduced.

The sort of the burner 4 used in the present invention is not specifically limited, and publicly known burners can be adopted. In addition to a natural gas and heavy oil, pulverized coal, waste oil, and discarded materials recovered, for example, powdery waste plastic, can also be put to effective use as the fuel for the combustion burner.

When the aforementioned oxygen-containing gas supply device for secondary combustion cannot be installed in the furnace, it is recommended to adopt a burner capable of burning in a condition of excessive air as the combustion burner in order to supply oxygen for burning the combustible gas generated by thermal decomposition of the combustible waste.

The number and installation location of the combustion burners installed in the furnace are not specifically limited as long as the temperature in the furnace can be kept at a predetermined temperature. However, when the inside of the furnace is separated by partition plates vertically installed from the ceiling portion, the temperature in each zone may be controlled by installing at least one combustion burner on a zone basis, and controlling individually the combustion burners.

In the present invention, the sort of the combustible waste subjected to combustion treatment in the rotary hearth furnace is not specifically limited, and any waste plastic, shredder residue, waste paper, RDF (waste subjected to a treatment for rendering to a solid fuel), etc., discarded as urban refuse, industrial waste or the like can be used. In the present invention, examples of combustible waste containing generation sources of volatile hazardous components include waste containing alkali metals, lead, or zinc, those containing chlorine, for example, vinyl chloride resin and vinylidene chloride resin, and those containing sulfur, for example, vulcanized rubber.

In the present invention, the shape of the combustible waste put into the rotary hearth furnace is not specifically limited as well. However, in consideration of smoothness in putting into the furnace, treatment efficiency, etc., it is preferable that the waste is used after being pulverized into sizes uniform to some extent, or pulverized waste is agglomerated into proper sizes. The sizes in this case are preferably specified to be on the order of 6 to 50 mm in diameter. Examples of shapes of the agglomerated materials include various shapes of, for example, a lump, particle, briquette, pellet, and bar, although, as a matter of course, not limited to these.

As the means for agglomeration, presses for briquetting (cylinder press, roll press, ring roller press, etc.), extruders, tumbling granulators (pan pelletizer, drum pelletizer, etc.) and other publicly known means can be adopted arbitrarily.

When noncombustible materials discharged from the rotary hearth furnace in the present invention were recovered, it was made clear that metal oxides contained together with the combustible waste had been reduced. As the result of further research, it was found out that the reduced metal and ash were able to separate by making the temperature in the combustion region equivalent to or more than the melting point of the ash in the noncombustible materials.

Furthermore, it was also made clear that when a metal oxide is mixed during the agglomeration of the combustible waste into the agglomerated material, for example, pellet, carbon derived from the combustible waste contributed to reduction of the metal oxide and, in addition, heat of combustion of the combustible gas generated from the combustible waste was used for the reduction of the metal oxide. Consequently, even when large quantities of combustible waste is treated at a time, a rapid increase in temperature can be inhibited.

In the present invention, by mixing the combustible waste and the metal oxide (for example, iron oxide and/or steel mill waste), combustion treatment of the waste can be performed with stability and, in addition, reduction, and melting and separation of metal-based and slug-based residue can also be performed.

The sort and mixing ratio of the metal oxide in the present invention is not specifically limited. However, it is recommended that the iron-based oxide is contained at 5% by mass or more relative to the agglomerated material put into the furnace, preferably, at 10% by mass or more, and at on the order of 50% to 85% by mass when reduction is intended.

The present invention will be described below in further detail using Examples. However, the following Examples do not essentially limit the present invention, and every design change based on the purport of the above and following description is included within the technical scope of the present invention.

EXAMPLES

Example 1

Combustible waste was subjected to a combustion treatment using an experimental rotary hearth furnace 3.5 m in diameter.

Figure 10:
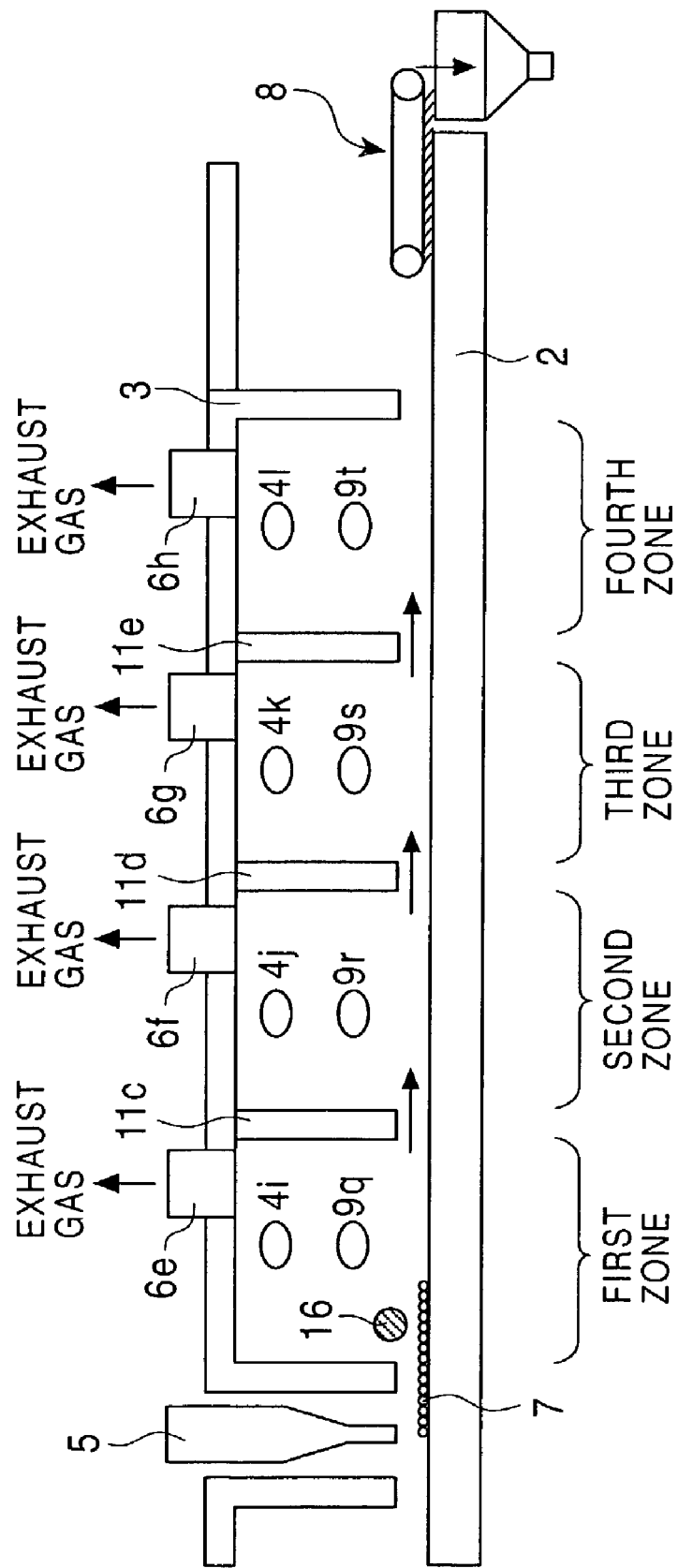
FIG. 10 is a developed view of a rotary hearth furnace used in Example.

A developed view of a rotary hearth furnace used in the experiment developed along the movement direction of a hearth is shown in FIG. 10. In the drawing, reference numeral 2 denotes a hearth, reference numeral 3 denotes a furnace body, reference numerals 4$i$ to 4$l$ denote combustion burners, reference numeral 5 denotes a supply port, reference numerals 6$e$ to 6$h$ denote exhaust gas outlets, reference numeral 7 denotes combustible waste, reference numeral 8 denotes a discharge device, reference numerals 9$q$ to 9$t$ denote oxygen-containing gas supply devices for secondary combustion, reference numeral 10 denotes a control device for controlling the quantity of supply of the oxygen-containing gas for secondary combustion, reference numerals 11$c$ to 11$e$ denote partition plates, and reference numeral 16 denotes a rotary leveling apparatus (leveler).

The inside of the furnace is separated into four zones (first zone to fourth zone) by the partition plates 11$c$ to 11$e$ in order to correspond to the combustion burners 4$i$ to 4$l$, respectively. The first zone and the second zone are controlled individually at 1,200° C., and the third zone and the fourth zone are controlled individually at 1,300° C. by the combustion burners.

Waste plastic having a heating value of about 20 to 30 MJ/kg was made into the shape of a pellet 16 to 20 mm in diameter, and the pellets were put into through the supply port 5 as combustible waste. At this time, in order to heat uniformly the combustible waste in the furnace, the thickness of the combustible waste was adjusted to be 100 mm or less from the hearth by the leveler 16.

Comparative Example

The combustible waste 7 was put into the furnace through the supply port 5 and, in addition, an adequate quantity (1,000 Nm$^3$/h) of oxygen-containing gas was supplied individually from the oxygen-containing gas supply devices 9$q$ to 9$t$ for secondary combustion into each of the first to fourth zone.

As a result, when the combustible waste was supplied at 110 kg/h, almost all of combustible waste underwent combustion treatment in the first zone, while the temperature in the first zone was increased rapidly to 1,300° C. At that time, total quantity of natural gas supplied to the combustion burners 4$i$ to 4$l$ was 161 Nm$^3$/h.

Although it is possible to operate while the oxygen-containing gas for secondary combustion is supplied adequately (1,000 Nm$^3$/h) in each of the first to fourth zone, the quantity of the combustible waste put into must be 90 kg/h or less in order that the combustible waste undergoes combustion treatment while the temperature in the furnace is maintained as described above to avoid damage to the inside of the furnace due to rapid increase in heating value and, therefore, the treatment efficiency is degraded by a large degree.

Present Invention Example 1

The combustible waste 7 was put into the furnace through the supply port 5 and, in addition, the oxygen-containing gas for secondary combustion was supplied at a modest level from the oxygen-containing gas supply devices 9$q$ to 9$t$ for secondary combustion into each of the first to fourth zone (the first zone was at 720 Nm$^3$/h, the second zone was at 320 Nm$^3$/h, the third zone was at 320 Nm$^3$/h, and the fourth zone was at 160 Nm$^3$/h).

As a result, even when the combustible waste is put into at 190 kg/h, combustion treatment can be performed without fluctuation of the temperature in the furnace. Consequently, in the present invention, the combustible waste can be subjected to the combustion treatment more efficiently than ever with no damage to the inside of the furnace.

At this time, needed total quantity of natural gas supplied to the combustion burners 4$i$ to 4$l$ is only 43 Nm$^3$/h and, therefore, combustion treatment cost can be reduced in the present invention.

Present Invention Example 2

The combustible waste 7 was put into the furnace through the supply port 5 and, in addition, the oxygen-containing gas for secondary combustion was supplied at a modest level into the first zone and the second zone compared to the quantity of oxygen required for burning the combustible gas generated in each zone (the first zone was at 720 Nm$^3$/h, and the second zone was at 320 Nm$^3$/h). In the third zone, the oxygen-containing gas for secondary combustion was supplied in order to burn adequately the combustible gas generated in that zone (the third zone was at 580 Nm$^3$/h). In the fourth zone, the oxygen-containing gas for secondary combustion was not supplied, and only the temperature in the zone was adjusted by the combustion burner 4$l$.

As a result, even when the combustible waste was put into at 190 kg/h, combustion treatment was able to perform without fluctuation of the temperature in the furnace. Furthermore, the total quantity of natural gas supplied to the combustion burner 4$l$ was able to reduce to 51 Nm$^3$/h.

Example 2

Combustible waste containing chlorine was subjected to a combustion treatment using the rotary hearth furnace shown in Example 1.

The inside of the furnace is separated into four zones (first zone to fourth zone) by the partition plates 11$c$ to 11$e$ in order to correspond to the combustion burners 4$i$ to 4$l$, respectively. The first zone was specified to be a preheating zone, and the second to fourth zones were specified to be a combustion region.

The first zone, second zone, third zone, and fourth zone were controlled at 350° C., 1,000° C., 1,300° C., and 1,300° C., respectively, by the combustion burners. At that time, the second and third zones are specified to be the upstream side in the combustion region, and the oxygen-containing gas for secondary combustion was supplied at a modest level (320

Nm³/h individually). The fourth zone is specified to be the downstream side in the combustion region, and the oxygen-containing gas for secondary combustion was supplied adequately (600 Nm³/h).

The chlorine-containing combustible waste contained a vinyl chloride resin, and waste plastic having a heating value of about 20 to 30 MJ/kg was made into the shape of a pellet 16 to 20 mm in diameter. Subsequently, the pellets were put into through the supply port 5.

As a result, in the first zone, dechlorination treatment was accelerated, and a chlorine-based exhaust gas containing a high proportion of hydrogen chloride was discharged through the outlet 6e. In the second and third zones, although the combustible waste after dechlorination was subjected to a combustion treatment, since the oxygen-containing gas for secondary combustion was supplied at a modest level, the temperature in the furnace was hardly fluctuated. On the other hand, regarding the fourth zone, since an adequate quantity of oxygen-containing gas for secondary combustion was supplied, unburned parts were burned completely, and only noncombustible materials are discharged to outside the system by a discharge device.

Example 3

Figure 11:
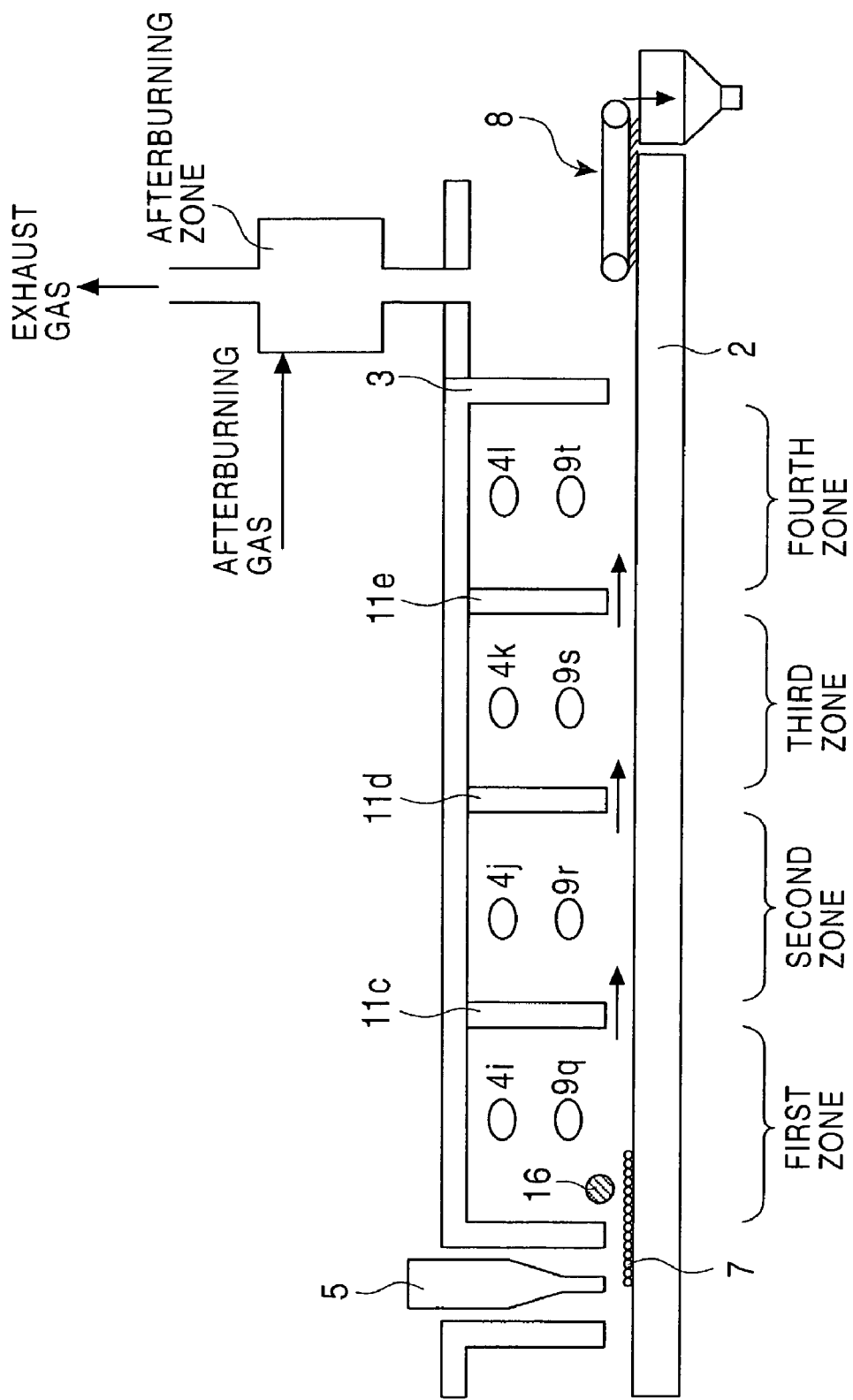
FIG. 11 is a developed view of another rotary hearth furnace used in Example.

The quantity of generation of dioxin in the case where combustible waste containing chlorine was subjected to the combustion treatment in the rotary hearth furnace shown in FIG. 11 was examined.

Regarding FIG. 11, instead of the configuration shown in FIG. 10, the exhaust gas outlets 6e to 6h are not installed, and the exhaust gases generated in the furnace are collectively supplied to an afterburning zone from the downstream side of the furnace. An afterburning gas (air or oxygen-rich air) is supplied to the afterburning zone, and the aforementioned exhaust gases are burned.

As a result, when the exhaust gases supplied to the afterburning zone were held for 1 second in a chamber at a temperature of 1,200° C., dioxin was able to reduce to 0.1 ng-TEQ/Nm³ or less. Wherein TEQ refers to the Toxic Equivalent.

Example 4

A mixture of combustible waste and steel mill waste (metal oxide) was agglomerated, was subjected to a combustion treatment in the rotary hearth furnace and, thereafter, the resulting effects were determined.

A mixture in which the steel mill waste was mixed at a ratio of 1 to 99% by mass relative to the combustible waste was molded into agglomerated materials on the order of diameter 20×30 mm. The agglomerated materials were subjected to a combustion treatment in the rotary hearth furnace, and as a result, when the metal oxide mixed into the combustible waste was up to 95% by mass, iron in the residue was reduced and was discharged as reduced iron having a metallization ratio of about 90% or more.

When mixed at 5% by mass or more, the maximum temperature in the furnace was able to keep constant at about 1,400° C. or less with ease at the upstream side in the combustion region. This is because the heat of combustion of the combustible waste is used for reduction of the metal oxide.

On the other hand, when the temperature at the downstream side in the combustion region was set at 1,500° C., since it was equivalent to or higher than the melting point of ash in the residue, iron and ash were separated and were discharged. At that time, iron was able to recover as high purity metallic iron.

What is claimed is:

1. A method for combustion treatment of combustible waste, which is a method for treating combustible waste, comprising the steps of:
   combustion-treating the combustible waste by applying the combustible waste on a rotary hearth of a rotary hearth furnace;
   moving the rotary hearth having the combustible waste thereon in a direction toward a discharge part of the furnace;
   supplying an oxygen-containing gas for secondary combustion at plural positions on the rotary hearth furnace in a direction of movement of the rotary hearth to burn a combustible gas generated by thermal decomposition of the combustible waste; and
   discharging residue remaining in the furnace as noncombustible materials from the discharge part of the furnace in case of residue remaining in the furnace.

2. The method for combustion treatment according to claim 1, wherein said step of supplying an oxygen-containing gas for secondary combustion at plural positions along the length of the rotary hearth furnace comprises:
   controlling the quantity of supply of the oxygen-containing gas for secondary combustion at a modest level at an upstream side in the combustion region of the combustible gas; and
   burning substantially the combustible gas by supplying adequately the oxygen-containing gas for secondary combustion at a downstream side.

3. The method for combustion treatment according to claim 1, wherein said step of supplying an oxygen-containing gas for secondary combustion at plural positions along the length of the rotary hearth furnace comprises controlling the quantity of supply of the oxygen-containing gas for secondary combustion at a modest level.

4. The method for combustion treatment according to claim 1, wherein the combustible waste generates a volatile hazardous component by heat reduction or thermal decomposition.

5. A method for combustion treatment comprising the steps of:
   combustion-treating combustible waste with a rotary hearth furnace;
   supplying an oxygen-containing gas for secondary combustion at plural positions along the length of the rotary hearth furnace to burn a combustible gas generated by thermal decomposition of the combustible waste, wherein said step of supplying an oxygen-containing gas for secondary combustion at plural positions along the length of the rotary hearth furnace comprises controlling the quantity of supply of the oxygen-containing gas for secondary combustion at a modest level at an upstream side in the combustion region of the combustible gas;
   burning substantially the combustible gas by supplying adequately the oxygen-containing gas for secondary combustion at a downstream side;
   installing at least two exhaust gas outlets in the combustion region; and
   drawing an exhaust gas generated in the furnace through each of the outlets.

6. The method for combustion treatment according to claim 5, further comprising the steps of:
    cooling the exhaust gas from the outlet installed at the upstream side in the combustion region, supplying to a heat exchanger, and performing heat recovery; and
    performing heat recovery from the exhaust gas from the outlet installed at the downstream side in the combustion region at a temperature higher than the heat recovery temperature at the upstream side.

7. The method for combustion treatment according to claim 5, further comprising the steps of:
    cooling the exhaust gas from the outlet installed at the upstream side in the combustion region, supplying to a heat exchanger, and preheating a gas; and
    mixing the resulting preheated gas and the exhaust gas from the outlet installed at the downstream side in the combustion region, and performing heat recovery from the resulting gas mixture.

8. A method for combustion treatment of combustible waste, which is a method for treating combustible waste, comprising the steps of:
    combustion-treating the combustible waste with a rotary hearth furnace, wherein the combustible waste generates a volatile hazardous component by heat reduction or thermal decomposition;
    installing a preheating zone on the side further upstream from the combustion region; and
    performing a separation treatment of the volatile hazardous component in the preheating zone and drawing a generated exhaust gas containing the volatile hazardous component from the preheating zone.

9. An apparatus for combustion treatment of combustible waste which is a rotary hearth furnace for treating combustible waste, comprising:
    an oxygen-containing gas supply device for secondary combustion in order to burn a combustible gas generated by thermal decomposition of the combustible waste in the neighborhood of a hearth of the rotary hearth furnace;
    a control device for controlling the quantity of supply of the oxygen-containing gas for secondary combustion in the combustion region of the combustible gas;
    at least two exhaust gas outlets in the combustion region; and
    a device for recovering heat from an exhaust gas from each of the outlets.

10. The combustion treatment apparatus according to claim 9, comprising:
    a device for cooling the exhaust gas from the outlet installed at the upstream side in the combustion region;
    a device for recovering heat from the resulting cooled exhaust gas; and
    a device for recovering heat from the exhaust gas from the outlet installed at the downstream side in the combustion region.

11. The combustion treatment apparatus according to claim 9, comprising:
    a device for cooling the exhaust gas from the outlet installed at the upstream side in the combustion region;
    a device for preheating a gas by the heat from the resulting cooled exhaust gas;
    a device for mixing the gas preheated by the preheating device with the exhaust gas from the outlet installed at the downstream side in the combustion region; and
    a device for recovering heat from the resulting gas mixture.

12. The combustion treatment apparatus according to claim 9, wherein:
    the combustible waste contains a generation source of a volatile hazardous component;
    a preheating zone is installed on the side further upstream from the combustion region; and
    an outlet for discharging an exhaust gas containing a volatile hazardous component generated in the preheating zone is installed.

* * * * *

UNITED STATES PATENT AND TRADEMARK OFFICE
CERTIFICATE OF CORRECTION

PATENT NO. : 7,032,526 B2
APPLICATION NO. : 10/223367
DATED : April 25, 2006
INVENTOR(S) : Tetsumoto et al.

It is certified that error appears in the above-identified patent and that said Letters Patent is hereby corrected as shown below:

On the title page, Item (73), the Assignee Information is incorrect. Item (73) should read:

--(73) Assignee: Kabushiki Kaisha Kobe Seiko Sho (Kobe Steel, Ltd.) Kobe (JP)--

Signed and Sealed this

Eleventh Day of July, 2006

JON W. DUDAS
*Director of the United States Patent and Trademark Office*